United States Patent [19]

Grossman

[11] 4,126,476

[45] Nov. 21, 1978

[54] ALUMINOUS QUARTZ CERAMICS AND METHOD

[75] Inventor: David G. Grossman, Corning, N.Y.

[73] Assignee: Corning Glass Works, Corning, N.Y.

[21] Appl. No.: 702,895

[22] Filed: Jul. 6, 1976

[51] Int. Cl.$^2$ ............................ C03C 3/22; C03C 3/04
[52] U.S. Cl. .................................... 106/39.7; 65/30 E
[58] Field of Search ........................ 106/39.6, 39.7, 52; 65/30 E

[56] References Cited

U.S. PATENT DOCUMENTS

| | | | |
|---|---|---|---|
| 3,252,811 | 5/1966 | Beall | 106/39.7 |
| 3,524,748 | 8/1970 | Beall | 106/39.6 |
| 3,681,097 | 8/1972 | Beall et al. | 106/39.6 |
| 3,834,981 | 10/1974 | Grossman et al. | 106/52 |
| 3,977,886 | 8/1976 | Muller | 106/39.7 |
| 4,011,091 | 3/1977 | McCollister | 106/39.7 |

*Primary Examiner*—O. R. Vertiz
*Assistant Examiner*—Mark Bell
*Attorney, Agent, or Firm*—Kees van der Sterre; Clinton S. Janes, Jr.; Clarence R. Patty, Jr.

[57] ABSTRACT

Ceramics comprising a crystal phase composed of a lithium-containing beta-quartz solid solution are treated with a strong acid to selectively remove lithium therefrom by a hydrogen-for-lithium ion exchange process. Heating of the resulting hydrogen-containing crystal phase drives off $H_2O$ and provides a ceramic product containing a previously unreported hexagonal aluminosilicate crystal phase, denominated aluminous quartz. Stuffed derivatives of aluminous quartz may also be provided.

4 Claims, 1 Drawing Figure

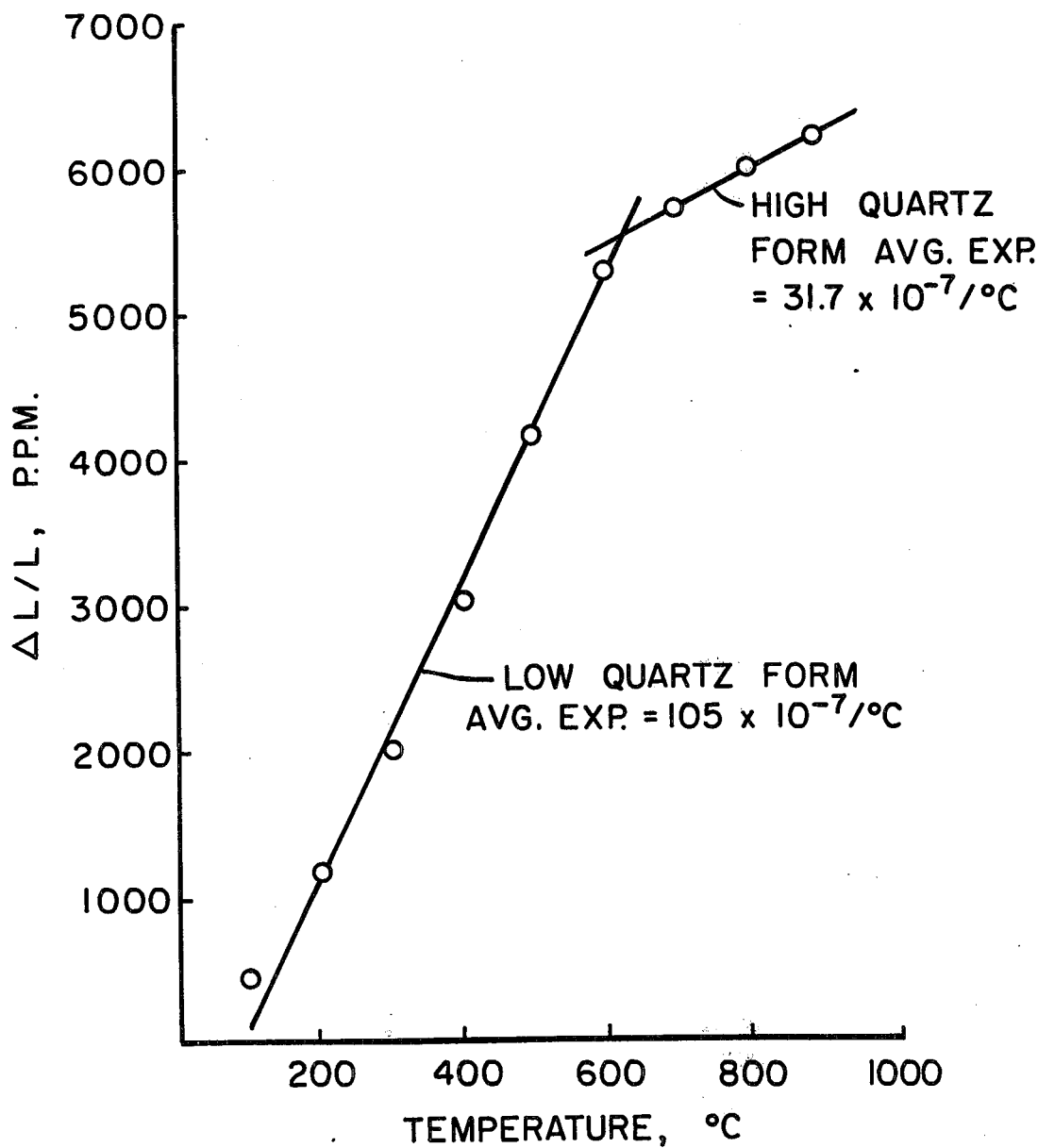

ALUMINOUS QUARTZ CERAMICS AND METHOD

BACKGROUND OF THE INVENTION

The present invention relates to acid treatments for ceramic articles and particularly involves the treatment of lithium-containing beta-quartz ceramics with strong acids to non-destructively remove lithium therefrom by an ion exchange process.

Beta-quartz (high quartz) is a hexogonal crystalline form of $SiO_2$, stable from 573°–870° C., which exhibits a slightly negative coefficient of thermal expansion. This form of silica is known to enter into solid solution with crystal species of analogous structure such as beta-eucryptite ($Li_2O.Al_2O_3.2SiO_2$), with the resulting quartz derivatives being denominated beta-quartz solid or "stuffed derivatives" of beta quartz. Some of these derivatives are described by M. J. Buerger in "The Stuffed Derivatives of the Silica Structures", Am. Mineral, 39, 600–614 (1954).

Ceramic articles, particularly glass-ceramic articles, are known wherein hexagonal beta-quartz solid solution comprises a principal crystal phase. U.S. Pat. No. 3,252,811 to Beall, for example, describes glass compositions suitable for the manufacture of transparent glass-ceramics wherein lithium, magnesium, or zinc-containing beta-quartz solid solutions constitute the crystal phases formed on heat treatment, making up more than about 50% by volume of the glass-ceramic articles. Similarly, U.S. Pat. No. 3,681,097 to Beall and Martin discloses glass-ceramics which comprise a zinc-stuffed beta-quartz crystal phase, such phase constituting more than about 50% by weight of the glass-ceramics.

Pure beta-quartz exhibits a displacive transformation at about 573° C., transforming to the higher expansion alpha-quartz (low quartz) form at temperatures below this point. Certain beta-quartz solid solutions of lithium aluminosilicate composition have recently been found to exhibit similar displacive transformations on cooling.

Ceramic articles comprising a lithium-containing beta-quartz solid solution crystal phase can be formed from lithium aluminosilicate batch compositions having a silica to alumina mole ratio ($SiO_2:Al_2O_3$) within the range of about 3.5 to 10. The degree of lithium beta-quartz crystallinity in the article is enhanced by maintaining an alumina:lithium oxide ratio ($Li_2O:Al_2O_3$) near 1:1, since solid solution is deemed to occur by substitution of $Li^+ + Al^{+3}$ units for $Si^{+4}$ units in the beta-quartz structure.

As is well known, lithium aluminosilicate ceramic batch compositions such as above described are also useful in the production of ceramic articles wherein beta-spodumene solid solution comprises a principal crystal phase. Beta-spodumene solid solutions are quite distinct from beta-quartz solid solutions, exhibiting a tetragonal crystal structure, a very low coefficient of expansion, and no displacive transformation on cooling. However, control over the crystal phase produced in lithium aluminosilicate compositions can be exercised by selecting the conditions of crystallization, most particularly the heat treatment temperature, and the nucleating agents, if any, utilized to promote crystal development, as is also well known.

The extraction of lithium from mineral beta-spodumene by a hydrogen-for-lithium ion exchange has been known since at least 1950, being described in U.S. Pat. No. 2,516,109 to Ellestad and Leute. More recently, Grossman and Rittler disclosed in U.S. Pat. No. 3,834,981 that lithium may be extracted from unitary ceramic materials comprising beta-spodumene solid solution crystals by the same hydrogen-for-lithium ion exchange. The extraction process is non-destructive, and a ceramic product comprising a new phase, termed "aluminous keatite", is produced by firing the ion exchanged material.

SUMMARY OF THE INVENTION

I have now discovered that lithium may be extracted from a ceramic article comprising lithium-containing beta-quartz solid solution as a principal crystal phase through a hydrogen-for-lithium ion exchange process. This process comprises contacting the beta-quartz crystal phase contained in the ceramic article with a strong acid for a time sufficient to replace at least some of the lithium in the quartz phase with hydrogen from the acid. The ceramic article treated should comprise a beta-quartz crystal phase which contains silica and alumina in a mole ratio ($SiO_2:Al_2O_3$) in the range of about 3.5 to 7, and lithia in an amount providing an $Li_2O:Al_2O_3$ mole ratio of at least about 0.6.

The product of the acid treatment step is a porous ceramic article comprising in at least a portion thereof a hydroxy aluminosilicate crystal phase, structurally analogous to beta-quartz solid solution, wherein lithium ions have been replaced by hydrogen ions in the crystal structure. No significant quantities of alumina or silica are removed by the acid extraction process. The postulated ion exchange reaction for this process is:

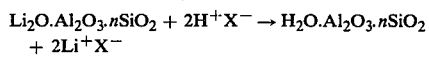

Following the extraction of at least some lithium from the article as above described, the article may be heated to effectuate the removal of the exchanged hydrogen. This process commences at temperatures in the range of about 350°–550° C. through the evolution of the water of crystallization from the crystal phase, the ceramic article having been rendered porous by the lithium extraction process. Evolution of water may continue to temperatures above 1000° C. The postulated reaction for this process is:

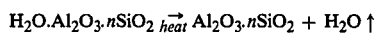

The product of heating at temperatures in the above range is a ceramic article comprising in at least a portion thereof a previously unreported aluminosilicate crystal phase, free of both lithium and hydrogen, which is hereinafter referred to as aluminous quartz. This aluminous quartz crystal phase is characterized by a hexagonal crystal structure, a unique X-ray diffraction pattern, and a composition which includes alumina and silica in a molar ratio ($SiO_2:Al_2O_3$) in the range of about 3.5–7, a ratio which is essentially unchanged from that of the starting composition.

In addition to the requisite proportions of $Li_2O$, $Al_2O_3$, and $SiO_2$, the beta-quartz crystal phase in the ceramic starting material may optionally contain one or more stuffing constituents selected from the group consisting of $Na_2O$, $K_2O$, $MgO$, $CaO$, $BaO$, $BeO$, $SrO$ and $ZnO$. These oxides are termed stuffing constituents since, like $Li_2O$ and $Al_2O_3$, they may enter into the crystal structure of the beta-quartz solid solution crystal phase. These oxide stuffing constituents (MO) may be present in the starting material in total proportions such that the MO:Al$_2$O$_3$ molar ratio is within the range of about 0–0.4.

Ceramic starting materials containing certain of these optional stuffing constituents, when treated with acid in accordance with the invention and thereafter heated to remove water of crystallization, provide a product comprising in at least a portion thereof a crystal phase which is referred to as stuffed aluminous quartz. Although the alkali-metal constituents Na$_2$O and K$_2$O are removed along with Li$_2$O during the ion-exchange process, the Group II metal oxides MgO, CaO, BaO, BeO, SrO and ZnO are relatively unaffected by the acid treatment and remain in the aluminous quartz structure as stuffing ions.

The resulting stuffed aluminous quartz crystal phases are characterized by hexagonal structure and also retain silica and alumina in a molar ratio (SiO$_2$:Al$_2$O$_3$) in the range of about 3.5–7. However their X-ray diffraction patterns differ somewhat from that of pure aluminous quartz due to the presence therein of one or more of the Group II metal oxide stuffing constituents MgO, CaO, BaO, BeO, SrO and ZnO. These may be present in the product in a total molar proportion providing a molar ratio (MO:Al$_2$O$_3$) in the range of about 0–0.4.

Thus there is provided in accordance with the invention not only a method for non-destructively removing extractable Li$_2$O from ceramics comprising a lithium-containing beta-quartz solid solution crystal phase, but also a process for providing ceramic articles comprising aluminous quartz and stuffed aluminous quartz crystal phases which exhibit a unique combination of chemical and physical properties.

DESCRIPTION OF THE DRAWING

The drawing consists of a graph illustrating the thermal expansion characteristics of an aluminous quartz glass-ceramic article provided in accordance with the invention, as hereinafter described. The change in length of the article, in parts per million, is plotted against the temperature of the article over the range 0°–1000° C. The plot is based upon measurements of the length of the sample at the indicated temperatures, the data points being shown as circles. The measurements are taken while the sample is heated over the indicated temperature range. The displacive transformation exhibited by aluminous quartz is manifested in this sample by the discontinous change in expansion rate which occurs at about 600° C.

DETAILED DESCRIPTION

Ceramic articles which may be treated in accordance with the invention include any of the conventional types of sintered or cast ceramics as well as glass-ceramics provided by the in situ crystallization of glasses. The articles may be highly porous, as in the case of certain sintered materials, or essentially non-porous, as in the case of glass-ceramics provided by the internal crystallization of bulk glasses. However, the article must comprise a lithium-containing beta-quartz crystal phase which is accessible or can be made accessible to the treating acid.

The composition of the ceramic article may of course comprise additional oxide or other constituents which do not interfere with or modify the basic and essential characteristics of the ceramic as a starting material. For example, fining agents and nucleating agents are typically included in minor amounts in glasses used to provide beta-quartz glass-ceramics by thermal crystallization. Typically these agents do not substantially affect the leaching properties of the ceramic starting material or, if retained, the properties of the aluminous quartz product.

Many of the optional modifiers impart beneficial properties to the starting material or product. The constituents K$_2$O and Na$_2$O, for example, are useful to modify the properties of the glass or ceramic batch utilized in the production of beta-quartz-containing starting materials. The constituents MgO, CaO, BaO, BeO, SrO and ZnO, which are retained in the quartz product, can advantageously affect the physical and thermal properties of the stuffed aluminous quartz crystal phase.

Preferred ceramic articles for treatment according to the invention are glass-ceramic articles of lithium alumino-silicate composition wherein a principal crystal phase composed of lithium-containing beta-quartz solid solution has been developed by the in situ crystallization of a glass. Such glass-ceramics may be provided by suitable heat treatment of glasses comprising a minor amount of a suitable nucleating agent such as TiO$_2$ or ZrO$_2$, using methods which are well known in the art.

Contact between the selected beta-quartz ceramic and the strong acid utilized to extract lithium therefrom may be accomplished by any suitable means, but the preferred practice is to immerse the ceramic to be treated in the selected acid or a solution thereof. Strong mineral acids such as H$_2$SO$_4$, HNO$_3$ and HCl are examples of acids which would be useful to carry out the ion-exchange process, although concentrated sulfuric acid or aqueous solutions thereof are the media most commonly employed.

Temperature affects the rate at which the lithium-for-hydrogen ion exchange reaction between the crystal phase and the acid progresses, and elevated temperatures, e.g., in the range 150°–320° C., are preferred in order to accelerate the extraction process. If concentrated sulfuric acid or sulfuric acid solutions are used, high temperature extraction may be carried out without the use of pressure equipment.

The rate of lithium extraction may be considerably affected by the presence of modifying oxides in the beta-quartz phase. Excess quantities of any of the modifiers can reduce the ion-exchange rate, although Na$_2$O, MgO, BaO and BeO do not exhibit a significant retarding affect if kept within the specified limits. ZnO, CaO and SrO somewhat reduce the extraction rate, but the inhibiting affect of CaO and SrO can be partially offset through the addition of some Na$_2$O. Finally, phases comprising silica in concentrations exceeding the SiO$_2$:Al$_2$O$_3$ ratio of about 7 are substantially more difficult to treat than are the less siliceous compositions.

The actual rate of ion exchange in beta-quartz ceramics would also depend on the microstructure of the material, being affected by factors such as porosity and the nature of other glassy or crystalline phases present therein. As an illustration of the rates which have been achieved, ion exchange into the surface of a highly-crystalline, non-porous lithium aluminosilicate glass-ceramic article comprising a beta-quartz phase of the molar composition [Li$_2$O.Al$_2$O$_3$.5SiO$_2$] occurs at a rate providing an exchanged surface layer having a thickness of the order of about 1 millimeter after treatment for 16 hours in concentrated H$_2$SO$_4$ at 260° C.

Since beta-quartz glass-ceramics of this type are normally transparent, the progress of the ion exchange reaction can readily be followed because the porosity produced during the substitution of $H^+$ for $Li^+$ imparts a translucency to the exchanged material. It is preferred to allow the ion exchange reaction to proceed substantially to completion throughout the entire thickness of the article, for reasons which will hereinafter more fully appear.

Following treating of the ceramic material in the acid exchange medium, the hyroxy aluminosilicate product may be washed in distilled water to remove residual acid and lithium salts, and thereafter dried to remove adsorbed water from the structure. The ion exchange process imparts very fine porosity to the treated material, producing pores of a size estimated at less than 100Å. Heating at moderate temperatures, e.g. 110° C., effectuates the removal of water from the pore structure, although the water of crystallization present in the $H_2O.Al_2O_3.nSiO_2$ crystal phase remains unaffected by such treatment.

The product of the extraction proces is a porous ceramic article comprising in at least a portion thereof a hydroxy aluminosilicate crystal phase comprising $H_2O$, $Al_2O_3$ and $SiO_2$, having a molar ratio ($H_2O:Al_2O_3$) in excess of about 0.6 and a molar ratio ($SiO_2:Al_2O_3$) in the range of about 3.5–7. The hydroxy aluminosilicate crystal is of hexagonal structure, having a unit cell volume slightly smaller than that of the beta-quartz phase from which it derives. This reduced cell volume produces the slight net shrinkage (about 3.5% by volume) which is observed to result from the acid treatment.

The removal of the water of crystallization from the hydroxy aluminosilicate crystals to produce an aluminous quartz phase commences upon heating the ion exchanged ceramic to a temperature in the range of about 350°–550° C., depending upon composition, and continues to temperatures on the order of about 1100° C. Temperatures as high as 1250° C., again depending on composition, may be used to insure complete removal without disrupting the aluminous quartz phase. The extent of removal depends on temperature, and may be controlled by selection of the temperature employed within the useful water removal range of about 350°–1250° C. This provides a means for controlling the extent of aluminous quartz crystallinity in the article. Temperatures in the range of 1000°–1250° C. are preferred for substantially complete water removal from most compositions.

The evolution of water from the crystal structure of the ceramic article is accompanied by substantial shrinkage of the material due to a further reduction in the size of the crystals. Linear shrinkage on the order of about 5% is typical. It will be apparent that shrinkage of this magnitude increases the difficulty of providing ceramic articles wherein only a surface portion of the material has been treated to provide a crystal phase of aluminous quartz. For this reason, processes implementing substantially complete removal of lithium from the beta-quartz phase and conversion to aluminous quartz are preferred.

The aluminous quartz product produced by the removal of bound water as above described retains both fine porosity and the hexagonal structure of the beta-quartz and hydroxy aluminosilicate precursor phases. The retention of crystal structure is evidenced by the X-ray diffraction patterns exhibited by the beta-quartz, hydroxy aluminosilicate, and aluminous quartz crystal phases present in the articles.

Table I below sets forth X-ray diffraction patterns for powder samples taken from a glass-ceramic article before, during and after conversion to aluminous quartz in accordance with the invention. The article treated comprised a principal crystal phase composed of a lithium-containing beta-quartz solid solution of the molar composition [0.85 $Li_2O$ . 0.15 $Na_2O$ . 1.1 $Al_2O_3$ 5.5 $SiO_2$]. The composition of the article further included about 2% $TiO_2$ and about 2% $ZrO_2$ by weight as nucleating agents. The diffraction pattern of this phase is shown in the first group of columns in the Table, which include the characteristic interplanar spacings (d), in angstrom units, the intensities ($I/I_o$) observed during the X-ray analysis of this phase.

The second group of columns in Table I sets forth the X-ray diffraction pattern obseved for the hydroxy alumino-silicate phase produced by complete ion exchange of the above-described beta-quartz glass-ceramic material in concentrated sulfuric acid at 295° C. The postulated molar composition of this phase is [1.0 $H_2O.1.1$ $Al_2O_3.5.5$ $SiO_2$], essentially all of the alkali metal oxide in the parent crystal phase having been replaced by hydrogen during the ion exchange process.

The third group of columns in Table I sets forth the X-ray diffraction pattern observed for the aluminous quartz phase produced by heating the above-described hydroxy aluminosilicate phase at 1000° C. for 2 hours. The aluminous quartz phase is believed to be essentially free of hydrogen, comprising alumina and silica in the molar ratio $Al_2O_3.5SiO_2$, plus minor amounts of the $TiO_2$ and $ZrO_2$ nucleating agents which largely remain after the extraction process.

TABLE I

| | | | | | | |
|---|---|---|---|---|---|---|
| X-RAY DIFFRACTION DATA | | | | | | |
| Crystal Plane | Beta-Quartz | | Hydroxy-Aluminosilicate | | Aluminous Quartz | |
| | I/I | d(Å) | I/I | d(Å) | I/I | d(Å) |
| 100 | 10 | 4.51 | 21 | 4.42 | 19 | 4.33 |
| 101 | 100 | 3.48 | 100 | 3.43 | 100 | 3.38 |
| 110 | 2 | 2.60 | 4 | 2.55 | 4 | 2.49 |
| 102 | 1 | 2.33 | 1 | 2.33 | 4 | 2.298 |
| 200 | 3 | 2.25 | 2 | 2.206 | 3 | 2.156 |
| 201 | 2 | 2.08 | 2 | 2.045 | | 2.006 |
| 112 | 13 | 1.879 | 8 | 1.863 | 11 | 1.834 |
| 202 | 1 | 1.732 | | | 1 | 1.686 |
| 211 | 5 | 1.623 | 4 | 1.595 | 5 | 1.558 |
| 203 | 4 | 1.414 | 3 | 1.415 | 7 | 1.388 |

The observed d-spacings for beta-quartz, hydroxy-aluminosilicate, and aluminous quartz reported in Table I above are in excellent agreement with the d-spacings calculated from the crystal cell constants $a$ and $c$ for each of the three types of crystals. These constants were calculated from the (112) and (211) diffraction lines for each crystal, based on a hexagonal structure. The computed cell constants, and the cell volumes derived therefrom for each crystal, are reported in Table II below.

TABLE II

| | | | |
|---|---|---|---|
| CRYSTAL CELL CONSTANTS | | | |
| | a. (Å) | c. (Å) | Volume (Å³) |
| Beta Quartz (hexagonal) | 5.195 | 5.441 | 127.2 |
| Hydroxy-Aluminosilicate (hexagonal) | 5.095 | 5.464 | 122.8 |
| Aluminous Quartz (hexagonal) | 4.996 | 5.418 | 115.7 |

The reductions in cell volume occuring as the result of the replacement of $Li^+$ by $H^+$ and the subsequent removal of $H^+$ as $H_2O$ are readily apparent from the data in Table II.

Pure aluminous quartz, free of both alkali metal oxides and Group II stuffing constituents, exhibits a high-low displacive transformation at 600° C. ± 20° C. This transformation is analogous to the displacive transformation typically exhibited by pure natural quartz at about 573° C.

The drawing consists of a plot of the thermal expansion of an aluminous quartz ceramic article provided in accordance with the invention. The article comprises an aluminous quartz phase of the approximate molar composition [$Al_2O_3 \cdot 5SiO_2$], also containing minor amounts of nucleating agents, provided by treating a beta-quartz glass-ceramic article with concentrated sulfuric acid at 270° C. for 50 hours, and thereafter firing the ion-exchanged product at 1150° C. for 2 hours.

The data points representing the change in the measured sample length at the indicated temperatures are shown as circles. The average linear coefficient of thermal expansion of the low quartz form, calculated from the slope of the line joining the data points in the 25°–600° C. range, is about $105 \times 10^{-7}$/° C. for this particular sample. The average linear coefficient of thermal expansion of the high quartz form, calculated from the slope of the line joining the data points in the 600°–900° C. range, is about $31.7 \times 10^{-7}$/° C. These coefficients of course vary depending in part upon the precise composition of the aluminous quartz phase present in the ceramic article.

The temperature at which the displacive transformation occurs in the ceramic product is considerably affected by the presence of modifying ions in the aluminous quartz structures. Such ions include any residual $H^+$ which is not removed by the firing process, as well as the Group II metal ions previously described. The affects of $H^+$ retention are shown by the fact that ceramic articles fired at temperatures significantly below 1100° C., which therefore comprise some residual $H^+$ ions in the crystal structure, exhibit substantially reduced inversion temperatures. These may range as low as 300°–350° C., depending upon the amount of $H_2O$ retained in the structure.

Some reduction in the inversion temperature can also be induced by the presence of Group II modifying ions in the quartz structure, with the extent of reduction depending upon the identity and quantity of modifiers present. In fact, stabilization of the high form of aluminous quartz to room temperatures can be achieved in certain compositions comprising a combination of residual $H^+$ and Group II modifiers in the crystal phase.

The firing of aluminous quartz ceramics at temperatures above about 1250° C. typically causes the breakdown of the aluminus quartz phase, loss of porosity, and the formation of a new set of phases in the article. These may include glass, mullite, cristobalite, and other crystal species, depending upon the firing temperatures employed and the nature of any modifying ions present in the composition. Breakdown may occur at lower temperatures in compositions comprising substantial amounts of Group II modifiers.

An advantageous aspect of this breakdown behavior is that mullite-containing glass-ceramics can be provided by suitable heat treatment of aluminous quartz products. Mullite glass-ceramics are difficult to produce by normal means due to the undesirable properties of their parent glasses, but may readily be provided from aluminous quartz glass-ceramics utilizing appropriate firing temperatures in the 1250°–1350° C. range.

The following examples illustrate some of the preferred procedures which may be utilized in the treatment of beta-quartz ceramic articles in accordance with the invention.

EXAMPLE I

A glass-ceramic article having a crystal phase consisting of a lithium-containing beta-quartz solid solution is provided for treatment. The crystal phase in the article has a molar composition of about [$0.85Li_2O \cdot 0.15Na_2O \cdot 1.0Al_2O_3 \cdot 4.5SiO_2$].

The selected glass-ceramic article is provided by compounding a batch for a glass approximating the desired crystal phase composition, the batch further including about 1.5% $TiO_2$ and 2% $ZrO_2$ by weight as nucleating agents. Pure sand, alumina, lithium carbonate, sodium carbonate, titania and zirconia are utilized as batch ingredients. The batch is melted in a platinum crucible held at 1650° C. for 16 hours, cast into glass shapes, crushed and remelted at 1650° C. to insure homogeneity, recast into a glass patty, and annealed at 650°–675° C.

The glass patty is then subjected to a crystallizing heat treatment comprising exposure to a temperature of 950° C. for 2 hours to develop a lithium-containing beta-quartz solid solution crystal phase therein. The glass-ceramic product thus produced is slightly hazy but transparent.

The glass-ceramic product is then cut into sections which are ground and polished to provide glass-ceramic plates for ion exchange treatment. A number of plates about 0.050 inches in thickness are provided for this purpose.

One of the glass-ceramic plates produced as described is immersed in concentrated sulfuric acid and maintained therein at a temperature of 250° C. for 16 hours. This treatment is of sufficient duration to permit ion-exchange throughout the entire thickness of the sample.

After ion exchange treatment, the plate is repeatedly rinsed in distilled water until the rinse solution remains neutral, and then dried at 110° C. to remove adsorbed water. Finally, the ion exchanged plate is fired at 950° C. for 2 hours to remove most of the water of crystallization therefrom, thus to provide a glass-ceramic article wherein aluminous quartz constitutes the principal crystal phase.

The analyzed compositions of both the starting beta-quartz glass-ceramic article and the aluminous quartz product provided by the above procedures are set forth in Table III below. The compositions are reported on a weight percent basis.

TABLE III

| Constituent | Beta-Quartz Solid Solution | Aluminous Quartz |
| --- | --- | --- |
| $Li_2O$ | 5.96 | 0.01 |
| $Na_2O$ | 2.26 | 0.01 |
| $Al_2O_3$ | 24.6 | 26.0 |
| $SiO_2$ | 63.7 | 70.0 |
| $TiO_2$ | 1.42 | 1.34 |
| $ZrO_2$ | 1.86 | 1.65 |
| Ignition Loss | 0.2 | 0.28 |

From the above analyses it can be seen that the lithium ions (and also the sodium ions) are almost totally removed from the beta-quartz crystals by the ion-exchange process. Some extraction of the nucleating agents $TiO_2$ and $ZrO_2$ also occurs, but the ratio of $Al_2O_3$ to $SiO_2$ remains approximately the same. Thus a ceramic article consisting essentially of alumina and silica, with only a minor amount of residual nucleating agents, is provided.

EXAMPLE 2

A glass-ceramic article having a crystal phase consisting of a lithium-containing beta-quartz solid solution, also comprising some ZnO and MgO as modifying ions, is provided for treatment. The glass-ceramic article is provided by thermal crystallization of a glass consisting essentially, in weight percent on the oxide basis, of about 1.2% ZnO, 1.6 MgO, 3.5% $Li_2O$, 20.5% $Al_2O_3$, 66.7% $SiO_2$, 4.8% $TiO_2$, 0.22% F, and 0.4% $As_2O_3$. Thermal crystallization of this glass is induced by a heat treatment comprising exposure to a temperature of 750° C. for 1 hour, followed by exposure to a temperature of 850° C. for 1 hour. The resulting glass-ceramic product is non-porous and highly crystalline.

A glass-ceramic plate 0.050 inches in thickness is cut from the described glass-ceramic article as in Example 1, and this plate is subjected to an ion exchange treatment comprising exposure to concentrated sulfuric acid at 280° C. for 100 hours. The ion-exchanged plate is then removed from the acid, repeatedly rinsed in distilled water to remove residual acid and metal salts, and then dried at 110° C. to remove adsorbed water.

Finally the ion-exchanged plate is fired at 1100° C. for 2 hours to remove the water of crystallization therefrom, converting the hydroxy aluminosilicate crystal phase produced by ion exchange treatment to an aluminous quartz phase.

Chemical analysis of the treated glass-ceramic plate discloses the following composition, in weight percent: 0.01% $Li_2O$, 1.7% MgO, 1.19% ZnO, 22.2% $Al_2O_3$, 68.9% $SiO_2$, 4.8% $TiO_2$, 0.40% F. and 0.34% $As_2O_3$. From the results of this analysis it is apparent that, whereas $Li_2O$ is essentially completely removed from the glass-ceramic article during conversion to aluminous quartz, the ion exchange treatment has only a minimal effect on the concentrations of MgO and ZnO therein.

The presence of MgO and ZnO modifiers in the aluminous quartz crystal phase of the article is evidenced by the reduced quartz transformation temperature exhibited thereby. On cooling, the treated article exhibits a high-low transformation at about 520° C., as compared with about 600° C. for an article comprising a pure aluminous quartz phase.

Examples of additional compositions for beta-quartz solid solution glass-ceramic articles which may be treated according to the invention are set forth in Table IV below. The base compositions of the articles are reported in terms of the mole proportions of the crystal phase constituents $Li_2O$, $Al_2O_3$, $SiO_2$ and modifiers present therein. Thus, for example, composition 1 in Table IV contains $Li_2O$, $Al_2O_3$ and $SiO_2$ in the molar proportions 1:1:6. The concentrations of the nucleating agents present in each base composition are reported in weight percent, calculated in excess of the base glass-ceramic composition. Thus composition 1 contains 2% $TiO_2$ and 2% $ZrO_2$ by weight in excess of the weight of the quantity of $Li_2O$, $Al_2O_3$ and $SiO_2$ present therein.

Also reported in Table IV are the depths of ion-exchange, in millimeters, observed for each composition following exposure to concentrated $H_2SO_4$ at 260° C. for 16 hours. Lower depths indicate increased difficulty in extracting $Li_2O$ from the sample. All samples are highly crystalline, essentially non-porous glass-ceramics having beta-quartz solid solution crystal phases corresponding approximately to the reported base compositions. Each was identically heat treated according to a schedule comprising heating to 850° C. at 200° C. per hour, holding at 850° C. for 2 hours, and cooling to room temperature.

TABLE IV

| | Composition - Molar Proportions | | | | | (weight %) | |
|---|---|---|---|---|---|---|---|
| $Li_2O$ | Alkali Modifier | Group II Modifier | $Al_2O_3$ | $SiO_2$ | $TiO_2$ | $ZrO_2$ | Layer (millimeters) |
| 1  | 1.00 | —         | —        | 1.00 | 6.0 | 2   | 2 | 1.5 |
| 2  | .90  | .10 $Na_2O$ | —      | 1.05 | 4.5 | 2   | 2 | 1.0 |
| 3  | .85  | .15 $Na_2O$ | —      | 1.05 | 4.5 | 2   | 2 | 1.0 |
| 4  | .80  | .20 $Na_2O$ | —      | 1.05 | 4.5 | 2   | 2 | 1.0 |
| 5  | .75  | .25 $Na_2O$ | —      | 1.05 | 4.5 | 2   | 2 | 0.7 |
| 6  | .70  | .30 $Na_2O$ | —      | 1.00 | 5.0 | 6.0 | — | 1.0 |
| 7  | .70  | .30 $Na_2O$ | —      | 1.00 | 5.0 | 3   | 2 | 1.0 |
| 8  | .60  | .40 $Na_2O$ | —      | 1.00 | 5.0 | 6.0 | — | 0.7 |
| 9  | .85  | .15 $Na_2O$ | —      | 1.10 | 4.5 | 2   | 2 | 0.7 |
| 10 | .85  | .15 $Na_2O$ | —      | 1.20 | 4.5 | 2   | 2 | 0.5 |
| 11 | .85  | .15 $Na_2O$ | —      | 1.30 | 4.5 | 2   | 2 | 0.7 |
| 12 | .85  | .15 $Na_2O$ | —      | 1.10 | 5.5 | 2   | 2 | 1.0 |
| 13 | .85  | .15 $Na_2O$ | —      | 1.10 | 6.5 | 2   | 2 | 0.3 |
| 14 | .85  | .15 $Na_2O$ | —      | 1.10 | 7.0 | 2   | 2 | 0.2 |
| 15 | .90  | .10 $K_2O$  | —      | 1.00 | 5.0 | 2   | 2 | 0.8 |
| 16 | .80  | .20 $K_2O$  | —      | 1.00 | 5.0 | 2   | 2 | 0.3 |
| 17 | .80  | .20 $K_2O$  | —      | 1.00 | 5.0 | 6.0 | — | 0.3 |
| 18 | .90  | .10 $K_2O$  | —      | 1.10 | 4.5 | 5.5 | — | 0.4 |
| 19 | .85  | .15 $K_2O$  | —      | 1.10 | 5.0 | 5.5 | — | 0.2 |
| 20 | .80  | .15 $Na_2O$ | .05 BeO | 1.00 | 5.0 | 2 | 2 | 0.9 |
| 21 | .80  | .10 $Na_2O$ | .10 BeO | 1.00 | 5.0 | 2 | 2 | 1.0 |
| 22 | .80  | .15 $Na_2O$ | .05 MgO | 1.00 | 5.0 | 2 | 2 | 1.0 |
| 23 | .80  | .10 $Na_2O$ | .10 MgO | 1.00 | 5.0 | 2 | 2 | 1.0 |
| 24 | .80  | .05 $Na_2O$ | .15 MgO | 1.00 | 5.0 | 2 | 2 | 1.0 |
| 25 | .80  | —           | .20 MgO | 1.00 | 5.0 | 2 | 2 | 0.9 |
| 26 | .75  | —           | .25 MgO | 1.00 | 5.0 | 2 | 2 | 1.0 |
| 27 | .70  | —           | .30 MgO | 1.10 | 6.0 | 6.0 | — | 0.5 |
| 28 | .70  | —           | .30 MgO | 1.10 | 6.0 | 2 | 2 | 0.8 |
| 29 | .60  | —           | .40 MgO | 1.10 | 6.0 | 2 | 2 | 0.2 |
| 30 | .80  | —           | .20 ZnO | 1.00 | 5.0 | 2 | 2 | 0.3 |
| 31 | .70  | —           | .30 ZnO | 1.10 | 6.0 | 2 | 2 | 0.3 |
| 32 | .60  | —           | .40 ZnO | 1.10 | 6.0 | 2 | 2 | 0.1 |
| 33 | .95  | —           | .05 CaO | 1.10 | 5.0 | 2 | 2 | 0.3 |
| 34 | .90  | —           | .10 CaO | 1.10 | 5.0 | 2 | 2 | 0.3 |
| 35 | .90  | —           | .10 CaO | 1.10 | 5.0 | 5 | — | 0.4 |
| 36 | .85  | —           | .15 CaO | 1.10 | 5.0 | 2 | 2 | 0.3 |
| 37 | .80  | —           | .20 CaO | 1.10 | 5.0 | 2 | 2 | 0.3 |

TABLE IV-continued

| | Composition - Molar Proportions | | | | | (weight %) | |
|---|---|---|---|---|---|---|---|
| | $Li_2O$ | Alkali Modifier | Group II Modifier | $Al_2O_3$ | $SiO_2$ | $TiO_2$ | $ZrO_2$ | Layer (millimeters) |
| 38 | .85 | .05 $Na_2O$ | .10 CaO | 1.10 | 5.0 | 2 | 2 | 0.7 |
| 39 | .80 | .15 $Na_2O$ | .05 CaO | 1.00 | 5.0 | 2 | 2 | 1.0 |
| 40 | .80 | .10 $Na_2O$ | .10 SrO | 1.00 | 5.0 | 2 | 2 | 0.2 |
| 41 | .80 | .10 $Na_2O$ | .10 BaO | 1.00 | 5.0 | 2 | 2 | 0.8 |

From the data set forth in Table IV, the broad applicability of the method of the present invention to extract lithium ions from a wide range of ceramic articles comprising a lithium-containing beta-quartz solid solution crystal phase is readily apparent. The modified products resulting from such treatment provide a unique combination of physical and chemical properties rendering them eminently suitable for use in a wide variety of diverse technical applications for which most other ceramic materials are largely unsuited.

I claim:

1. A lithium aluminosilicate glass-ceramic article comprising a principal crystal phase composed of a lithium-containing beta-quartz solid solution, said solid solution containing silica and alumina in a molar ratio ($SiO_2:Al_2O_3$) in the range of about 3.5–7 and lithia in an amount providing a $Li_2O:Al_2O_3$ mole ratio of at least about 0.6, wherein at least part of the beta-quartz solid solution crystal phase has been converted by lithium extraction to an aluminous quartz crystal phase characterized by:

(a) a composition comprising alumina and silica in a molar ratio ($SiO_2:Al_2O_3$) in the range of about 3.5–7;
(b) a hexagonal crystal structure; and
(c) an X-ray diffraction pattern comprising intensities ($I/I_o$) and interplanar spacings (d) conforming substantially to the following:

| Crystal Plane | $I/I_o$ | d(Å) |
|---|---|---|
| 100 | 19 | 4.33 |
| 101 | 100 | 3.38 |
| 110 | 4 | 2.49 |
| 102 | 4 | 2.298 |
| 200 | 3 | 2.156 |
| 201 | 2 | 2.006 |
| 112 | 11 | 1.834 |
| 202 | 1 | 1.686 |
| 211 | 5 | 1.558 |
| 203 | 7 | 1.388 |

2. A lithium aluminosilicate glass-ceramic article comprising a principal aluminous quartz crystal phase, produced by the extraction of lithium from a lithium containing beta-quartz solid solution phase, said aluminous quartz crystal phase being characterized by:

(a) a composition comprising alumina and silica in a molar ratio ($SiO_2:Al_2O_3$) in the range of about 3.5–7;
(b) a hexagonal crystal structure; and
(c) an X-ray diffraction pattern comprising intensities ($I/I_o$) and interplanar spacings (d) conforming substantially to the following:

| Crystal Plane | $I/I_o$ | d(Å) |
|---|---|---|
| 100 | 19 | 4.33 |
| 101 | 100 | 3.38 |
| 110 | 4 | 2.49 |
| 102 | 4 | 2.298 |
| 200 | 3 | 2.156 |
| 201 | 2 | 2.006 |
| 112 | 11 | 1.834 |
| 202 | 1 | 1.686 |
| 211 | 5 | 1.558 |
| 203 | 7 | 1.388 |

3. A lithium aluminosilicate glass-ceramic article comprising a principal crystal phase composed of a lithium-containing beta-quartz solid solution, said solid solution containing silica and alumina in a molar ratio ($SiO_2:Al_2O_3$) in the range of about 3.5–7, lithia in an amount providing a $Li_2O:Al_2O_3$ mole ratio of at least about 0.6, and at least one oxide stuffing constituent (MO) selected from the group consisting of $Na_2O$, $K_2O$, MgO, CaO, BaO, SrO, BeO and ZnO, said stuffing constituent being present in a total proportion such that the $MO:Al_2O_3$ ratio does not exceed about 0.4, wherein at least part of the beta-quartz solid solution crystal phase has been converted by lithium extraction to a stuffed aluminous quartz crystal phase which:

(a) comprises alumina and silica in a molar ratio ($SiO_2:Al_2O_3$) in the range of about 3.5–7;
(b) has a hexagonal crystal structure; and
(c) comprises as a stuffing constituent (MO) at least one Group II metal oxide selected from the group consisting of MgO, CaO, BaO, SrO, BeO, and ZnO, the molar ratio of said stuffing constituent to $Al_2O_3$ ($MO:Al_2O_3$) not exceeding about 0.4.

4. A lithium aluminosilicate glass-ceramic article comprising a principal crystal phase composed of stuffed aluminous quartz, said crystal phase being produced by the extraction of lithium from a lithium-containing beta-quartz solid solution phase, and said stuffed aluminous quartz crystal phase;

(a) comprising alumina and silica in a molar ratio ($SiO_2:Al_2O_3$) in the range of about 3.5–7;
(b) having a hexagonal crystal structure; and
(c) comprising as a stuffing constituent (MO) at least one Group II metal oxide selected from the group consisting of MgO, CaO, BaO, SrO, BeO, and ZnO, the molar ratio of said stuffing constituent to $Al_2O_3$ ($MO:Al_2O_3$) not exceeding about 0.4.

* * * * *

UNITED STATES PATENT AND TRADEMARK OFFICE
CERTIFICATE OF CORRECTION

PATENT NO. : 4,126,476
DATED : November 21, 1978
INVENTOR(S) : David G. Grossman It is certified that error appears in the above-identified patent and that said Letters Patent are hereby corrected as shown below:

Column 1, line 17, after "solid" insert -- solutions --.

Column 5, line 9, "hyroxy" should be -- hydroxy --.

Column 6, line 7, "$Al_2O_35.5\ SiO_2$]." should be -- $Al_2O_3 \cdot 5.5\ SiO_2$]. --.

Column 6, Table I, Aluminous Quartz column I/I, between "3" and "11" insert -- 2 --.

Column 9, line 35, "F." should be -- F --.

Columns 9 and 10, Table IV, above column heading "(weight %) $ZrO_2$" insert -- Nucleating Agents --.

Columns 9 and 10, Table IV, above column heading "Layer (millimeters)" insert -- Depth of Ion-Exchange --.

Columns 9 and 10, column heading "(weight %) $ZrO_2$", Examples 1 through 14, the numerical listing should be moved to the left.

UNITED STATES PATENT AND TRADEMARK OFFICE
CERTIFICATE OF CORRECTION

PATENT NO. : 4,126,476

DATED : November 21, 1978

INVENTOR(S) : David G. Grossman

It is certified that error appears in the above-identified patent and that said Letters Patent are hereby corrected as shown below:

Columns 9 and 10, column heading "Layer (millimeters)", Examples 15 through 37, the numerical listing should be moved to the right.

Columns 11 and 12, Table IV-continued, above column heading "(weight %) $ZrO_2$" insert -- Nucleating Agent --.

Columns 11 and 12, Table IV-continued, above column heading "Layer (millimeters)" insert -- Depth of Ion-Exchange --.

Signed and Sealed this

*Twenty-first* Day of *August 1979*

[SEAL]

*Attest:*

*Attesting Officer*

LUTRELLE F. PARKER
*Acting Commissioner of Patents and Trademarks*